A. P. BANSCHER.
CORNSTALK CUTTER.
APPLICATION FILED AUG. 17, 1912.

1,048,641.

Patented Dec. 31, 1912.

Witnesses

A. P. Banscher,
Inventor by C. A. Snow & Co.
Attorneys

UNITED STATES PATENT OFFICE.

AUGUST P. BANSCHER, OF MILAN, ILLINOIS.

CORNSTALK-CUTTER.

1,048,641.     Specification of Letters Patent.     Patented Dec. 31, 1912.

Application filed August 17, 1912. Serial No. 715,653.

*To all whom it may concern:*

Be it known that I, AUGUST P. BANSCHER, a citizen of the United States, residing at Milan, in the county of Rock Island and State of Illinois, have invented a new and useful Cornstalk-Cutter, of which the following is a specification.

The present invention relates to improvements in corn stalk cutters.

The primary object of the invention is the provision of a sulky cutter to which are properly connected two diverging cutter blades, said blades being normally tensioned toward the surface so as to shear the stalks at the ground line and thus remove all objectionable obstructions that would interfere with subsequent cultivating of the soil, a hand lever and locking device being provided to regulate the downward movement of the blades and at the same time the height of the cutting edges relatively to the frame and tires of the wheels.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
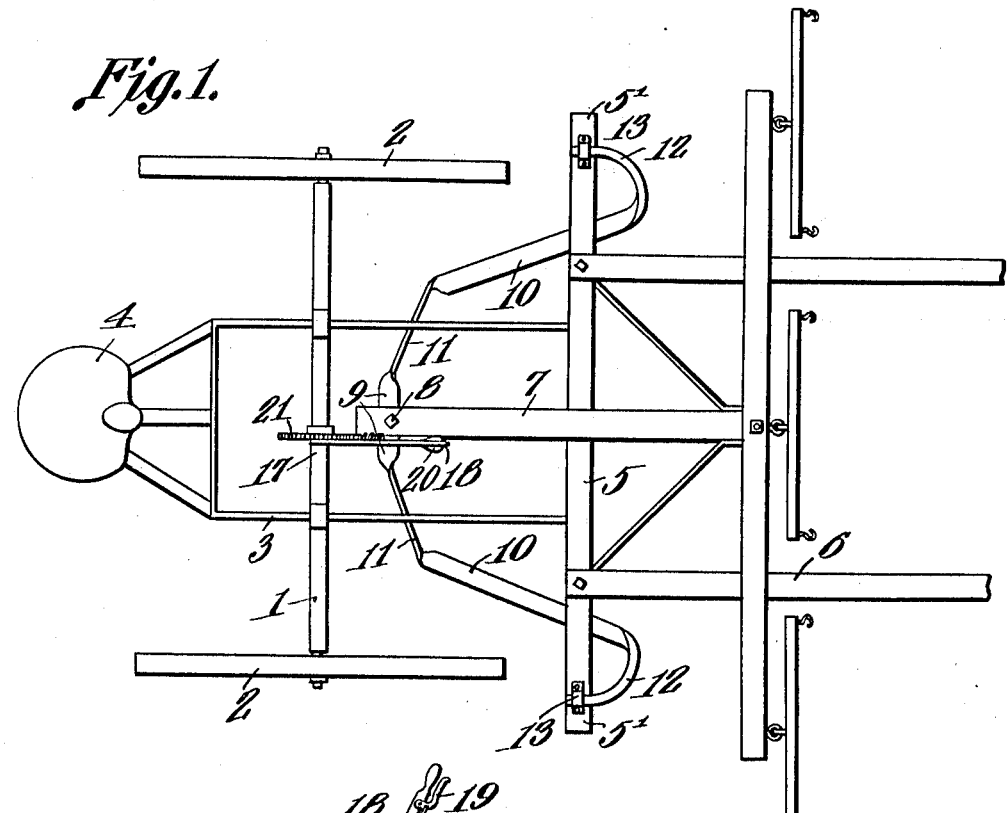
Figure 2:
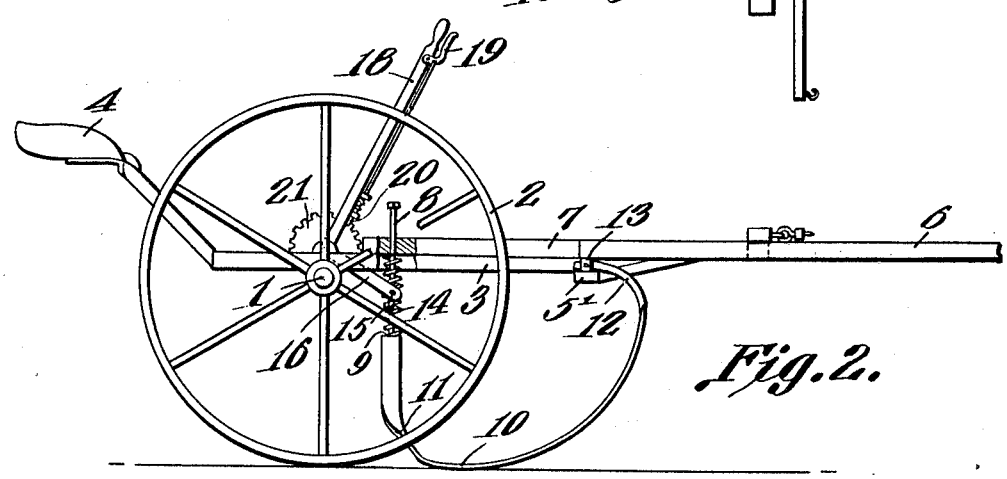

In the drawings—Figure 1 is a top plan view of the complete stalk cutter. Fig. 2 is a side elevation thereof.

Referring to the drawings, the numeral 1 designates the axle carrying the two wheels 2 and the frame 3, said frame 3 being provided with the driver's seat 4 and connected at its forward end to support the cross bar 5, to which is connected the draft shaft 6.

In the present instance, the draft connection is constructed for the attachment thereto of the three draft animals, but it is evident that the same may be constructed to be drawn by a single draft animal.

Connected centrally to the cross bar 5 and extending rearwardly between the frame 3 to the front of the axle 1 is a bar 7 through which is slidably mounted a vertically disposed bolt 8, the lower end of said bolt being connected to the flat terminals 9 of the diverging blades 10. These blades are each constructed of a single piece of flat metal and are curved as at 11 with a forward upturned end 12 which is in front of and connected by means of the strap 13 to the respective projecting ends 5' of the cross bar 5.

The curved end 12 of each plate offers a certain resiliency to the blade to normally retain the same downwardly toward the surface traversed, but in order to insure a resilient tension of the blade 10 toward the ground during the cutting of the stalks and present the cutting edge thereof to the stalks at the ground line, a coiled spring 14 is placed upon the bolt 8 between the terminals 9 of the blades 10 and the under surface of the bar 7. By this means the spring exerts a tension downwardly to hold the blade in the position as shown in Fig. 2.

In order to regulate the distance of the blade from the ground, a link 15 is connected to the terminals 9 of the blade and to this link is connected the arm 16 of the bell crank lever which is pivoted upon the short shaft 17 mounted in the frame 3. To operate the lever 16, the hand lever 18 is projected above in operable relation to the driver, and in order to retain the lever 18 in desired adjusted position, the handle 19 with its spring projected detent 20 is carried by the lever 18 and is in operable relation to the stationary toothed segment 21 keyed upon the shaft 17.

With the construction of the device herein shown, two rows of standing stalks are cut simultaneously, but if so desired a single blade 10 may be employed for cutting a single row. The forward curved edges of the respective blades, in addition to providing a resilient support for the blade, also are curved so as to brush aside any obstruction, such as clods of dirt and will also guide the blade over any rough surfaces during the passage of the sulky while cutting the stalks.

By positioning the blades as indicated and also in close proximity to the surface traversed, the stalks whether in a vertical or leaning position will be readily cut, and as the cutting edges of the blades 10 engage the stalks at a point directly in line with the ground, and are presented at an incline to the stalks, the stalks are properly sheared without the roots being pulled from the ground.

What is claimed is:

1. A stalk cutter, including a wheeled frame, a cutter blade resiliently connected to and supported from the frame at its front and rear ends and having a tension toward the ground, and means for regulating the downward movement of the rear end of the blade.

2. A stalk cutter, including a wheeled frame, two cutter blades disposed to cut at an angle to the path of travel, the forward ends of the blades being resiliently connected to the frame, a vertically slidable means for connecting the rear ends of the blades to the frame, and a spring for holding the rear ends resiliently toward the surface traversed.

3. A stalk cutter, including a wheeled frame, two cutter blades disposed to cut at an angle to the path of travel, the forward ends of the blades being resiliently connected to the frame, a vertically slidable means for connecting the rear ends of the blades to the frame, a spring for holding the rear ends resiliently toward the surface traversed, and manually operated means for raising the rear ends of the blades against the tension of the spring.

4. A stalk cutter including a wheeled frame, two flat metal members bent to form a curved forward end, a centrally disposed cutting blade and an upwardly and inwardly projecting terminal, means for connecting the curved ends to the frame, a bolt connecting the other terminals to the frame for vertical movement, a spring upon the bolt for holding the said ends downwardly, and manually operated means for raising the said ends of the cutting member against the tension of the spring.

5. A stalk cutter including a wheeled frame provided with a cross bar having oppositely projecting free ends, two cutter blades the forward ends of which are curved upwardly and connected to the free ends of the cross bar, and the rear ends of which are extended upwardly and inwardly to the center of the frame, a bolt connecting said rear ends for movement in unison, and a spring upon the bolt for holding the rear ends of the blades downwardly and into engagement with the surface traversed.

6. A stalk cutter, including a wheeled frame, provided with a cross bar having oppositely projecting free ends, two cutter blades, the forward ends of which are curved upwardly and connected to the free ends of the cross bar, and the rear ends of which are extended upwardly and inwardly of the center of the frame, a bolt connecting said rear ends for movement in unison, a spring upon the bolt for holding the rear ends of the blades downwardly and into engagement with the surface traversed, and manually operated means connected to the rear ends of the blades for raising the same against the tension of the spring.

In testimony that I claim the foregoing as my own, I have hereto affixed my signature in the presence of two witnesses.

AUGUST P. BANSCHER.

Witnesses:
Mrs. DAVIS CONNELLY,
E. D. FISHER.

---

Copies of this patent may be obtained for five cents each, by addressing the "Commissioner of Patents, Washington, D. C."